United States Patent Office 3,479,397
Patented Nov. 18, 1969

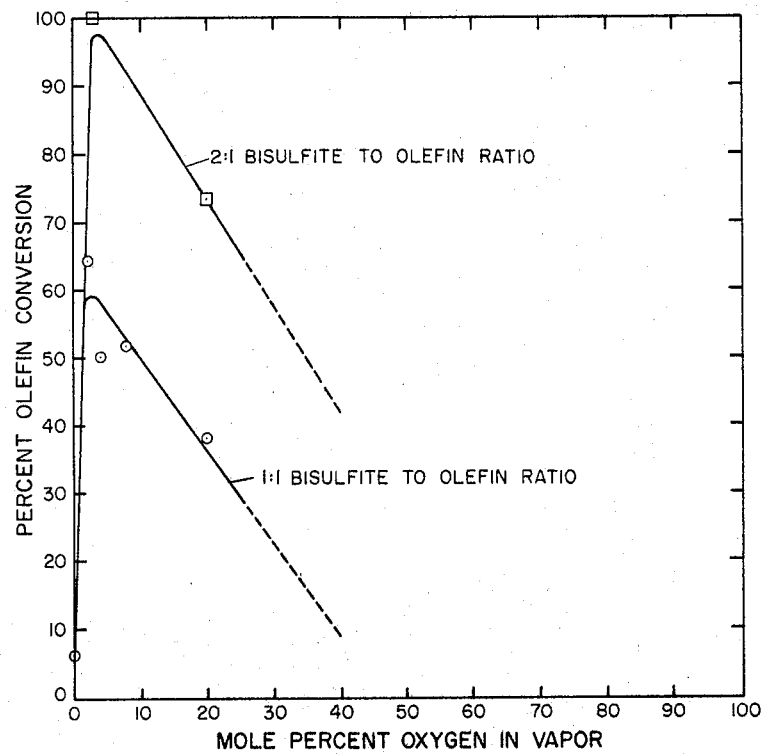

3,479,397
PREPARATION OF SULFONATES BY THE REACTION OF OLEFINS AND BISULFITE
Charles J. Norton, Denver, and Ned F. Seppi, Littleton, Colo., assignors to Marathon Oil Company, Findlay, Ohio, a corporation of Ohio
Filed Sept. 9, 1965, Ser. No. 486,137
Int. Cl. C07c *139/12*
U.S. Cl. 260—503  7 Claims

ABSTRACT OF THE DISCLOSURE

The present invention comprises a method for the production of organic sulfonates from unsaturated organic compounds and soluble noninterfering bisulfite comprising in combination the steps of reacting a soluble noninterfering bisulfite with unsaturated organic compounds having from 2 to about 40 carbon atoms, said reaction being conducted at a temperature of from about 50 to 300° C. in the conjoint presence of from 0.5 to about 10 mole percent oxygen in the vapor phase and a catalyst comprising a soluble compound containing cations chosen from the group consisting of alkali metals and their ammonium and alkyl ammonium and aryl ammonium analogues; and metals of subgroups II–A, III–A, IV–A, I–B, II–B, III–B, and first row "transition series" metals excluding copper, and a solvent containing at least about 1% water wherein there are present from 0.1 to about 10 moles of bisulfite per mole of double bond in the unsaturated hydrocarbon, from about 0.01 to about 1.0 mole of catalyst per mole of unsaturated hydrocarbon, and from about 0.25 to about 10 volumes of solvent per volume of unsaturated hydrocarbon and wherein the pH is maintained in the range of from about 4 to about 9.

The present invention relates to the preparation of sulfonates by the addition of bisulfite ions to the double bonds of unsaturated hydrocarbons. More particularly, this invention relates to a catalyzed reaction for producing sulfonates by bisulfite addition to double bonds.

The reaction of olefins with bisulfite ions is well known in the art, but previous methods have not been considered commercially feasible, and bisulfite addition is generally not even mentioned in reviews of commercial processes for production of organic sulfonates. The present reaction offers an economic route for the preparation of sulfonates which are useful as detergents, surfactants, tanning agents, and fuel additives. In addition, the preferred products of the present reaction exhibit very superior biodegradability.

To determine the comparative efficiencies of various reactions of bisulfite with olefins, one must consider the percent of the olefin which reacts with the bisulfite (the conversion) as well as the yield of sulfonate based on the reacted olefin. The present invention embodies the discovery that the conversion of unsaturated hydrocarbons to sulfonates by reaction with bisulfite ions is greatly improved when the reaction is conducted in the presence of certain specific catalysts and under certain narrow ranges of oxygen content. In accordance with this invention, alkyl sulfonates can be formed by mixing an olefin, a source of bisulfite ions, and a soluble catalyst in the presence of a suitable solvent and certain mole percent ranges of oxygen. The reaction mixture is then heated to above room temperature. The present invention provides conversion generally more than twice as high as those obtained under optimum conditions in the absence of catalysts and also provides nearly quantitative yields.

Both the cation and the anion of the catalysts of the present invention have been discovered to be important. The preferred anions are nitrates, nitrites, halides, sulfates, acid sulfates, phosphates, acid phosphates, carbonates, bicarbonates, borates, silicates, carboxylates, alkyl sulfonates, and alkyl phosphates.

Although not themselves catalytic, bisulfite and sulfite anions may be preferred in forming soluble salts of certain catalytic cations.

Cations can be chosen from Subgroup I–A alkali metals and their ammonium and alkyl ammonium and aryl ammonium analogues, preferably potassium; Subgroup II–A alkaline earth metals, preferably magnesium; Subgroup III–A, preferably aluminum; Subgroup IV–A, preferably lead; Subgroup I–B, preferably silver; Subgroup II–B, preferably zinc and cadmium; Subgroup III–B, preferably rare earths; and first row "transition series" metals, especially iron, cobalt, nickel, and preferably zinc, but excluding copper. Especially preferred are compounds containing cations and anions both of which are preferred, e.g., potassium nitrate, zinc nitrate, aluminum nitrate, cadmium nitrate, bismuth nitrate, chromium nitrate, ammonium nitrate, cesium ammonium nitrate, lithium nitrate, zinc acetate, zinc bromide, and zinc oxide. The high valence states of metals are preferred.

The preferred unsaturated hydrocarbon starting materials are olefins, most preferably alpha-olefins. But an important advantage of the invention is its ability to employ any of a wide range of carbon chain lengths and structures of unsaturated hydrocarbons including olefins and acetylenes of straight chain and cyclic configuration.

Conversions substantially higher than those of a un-catalyzed reaction are obtained when from about 0.01 to about 1.0 and most preferably from about 0.05 to about 0.5 mole of catalyst are present per mole of unsaturated hydrocarbon. With the above most preferred catalysts (the nitrates of potassium, alkaline earth metals, aluminum and zinc) especially good results have been found to be available when from 0.1 to 0.2 mole of nitrate are present per mole of unsaturated hydrocarbon.

Sodium bisulfite is the preferred source of bisulfite ions. However, any noninterfering compound which forms bisulfite ions in the reaction mixture may be utilized. By non-interfering bisulfites is meant those bisulfite-forming compounds which do not cause undersirable side reactions including among others: potassium, zinc, aluminum, lithium, and ammonium bisulfites. In addition to bisulfites, most pyrosulfites and metabisulfites may be used. Preferably from 0.1 to about 10 moles of bisulfite are utilized per mole of double bond in the unsaturated hydrocarbon and optimum results are generally obtained with from 0.5 to about 5 moles of sodium bisulfite per mole of double bond in the unsaturated hydrocarbon.

Copper salts, metallic copper and metallic iron are catalysts for the oxidation of bisulfites and are deleterious.

The reaction is conducted in the presence of surprisingly narrow ranges of oxygen. It has been discovered that the mole percent oxygen in the vapor phase must be maintained at from about 0.5 to about 20 more preferably from 0.5 to 10 and most preferably from 2 to about 5. Oxygen contents higher than these tend to inhibit rather than to enhance the reaction. Partial pressures of oxygen below the above mentioned ranges are surprisingly uneconomic.

The surprising criticality of the mole percent oxygen in the vapor phase is illustrated by FIGURE 1 which shows the results of a series of runs at two different ratios of bisulfite to olefin as noted on the graph. The conditions for these runs were 110° C., average reaction temperature, approximately 3 hours, reaction time, 0.2 mole of NaHSO₃; 0.02 mole KNO₃; 50 ml. of water; 50.0 ml. of isopropanol. It will be noted that the percent conversion increases very sharply from 0% to about 3.6% oxygen.

Thereafter the percent conversion falls off rapidly and conversions at about 20 mole percent oxygen are 20 percentage points below the maximum and, therefore, commercially unattractive under normal circumstances.

The reaction is preferably conducted in the presence of a solvent which is substantially nonreactive with the starting materials and end products. Suitable solvents include liquid hydrocarbons having suitable boiling points, esters, ethers, alcohols, glycols, amines, and amino alcohols. Particularly preferred are low molecular weight alcohols, e.g., isopropyl alcohol, because of their good solubilizing properties, ready availability, and convenient recovery. From 0.25 to about 10 volumes of solvent will generaly be utilized per volume of unsaturated hydrocarbon reactant, and 1:1 is the most preferred ratio.

In general some water is necessary to at least partially solubilize the sodium bisulfite, but since the hydrocarbons are only slightly soluble in water, it is usually necessary to use approximately 20% or more of the above mentioned organic solvents. Thus the preferred reaction mixtures will contain from about 1 to about 75% water together with one of the above mentioned organic solvent, most preferably isopropyl alcohol.

A surfactant is preferably added to the reaction mixture in amounts of from 0.1 to about 5% by weight. While the presence of the surfactant is not necessary to the present invention, it increases conversion rates significantly. Preferred surfactants are the conventional higher alkyl sulfonates, but a wide variety of cationic, nonionic and anionic surfactants may be employed. The product of the reaction is most preferred.

The reaction is conducted at an elevated temperature. Generally, temperatures in the range of from 50 to about 300° C. are operative and more preferred are temperatures of from 70 to about 150° C. When the preferred nitrates of zinc, aluminum or potassium are employed as catalysts, the optimum temperatures will generally be in the range of from 100 to 120° C.

While not narrowly critical, the pH will preferably be maintained at from 4 to 9 and most preferably at from 5 to 7 during the reaction.

The following examples will point out by way of illustration certain embodiments of this invention.

EXAMPLE I

In a 500 ml. Parr reaction bottle there are placed 50.0 ml. of water, 50.0 ml. of isopropanol, 25.0 ml. of dodecene-1 (0.11 mole), 21.0 g. of sodium bisulfite (0.2 mole) and 3.0 g. of zinc nitrate hexahydrate (0.01 mole). The vessel is put in the Parr apparatus and shaken at 110° C. for three hours under an oxygen partial atmosphere of 2 pounds per square inch. The reaction mixture is then cooled to room temperature and separated. 2.1 ml. of unreacted dodecene-1 are obtained, along with an aqueous alcohol phase of product. The product phase is adjusted to pH 8.0 by the addition of aqueous sodium hydroxide. Following this, it is evaporated to dryness and vacuum dried. A reaction mixture containing 26.1 g. sodium dodecyl sulfonate is obtained. Based on the amount of olefin consumed, a 94.6 weight percent yield of sulfonate is obtained with 92% conversion.

EXAMPLE II

A series of reactions are conducted with reaction mixtures containing 0.01 mole of catalyst. For purposes of comparison, no catalyst is employed in run No. 2a. In each case, the reaction mixture is comprised of 0.2 mole sodium bisulfite, 0.22 mole dodecene-1, 50 ml. of water, and 50 ml. of isopropanol. The reactions are conducted in a Parr vessel with shaking at 80° C. for 20 hours under a partial pressure of oxygen of 1 pound per square inch. The results of these reactions with different catalyst are set forth in Table 1.

As shown by Table 1, the uncatalyzed reaction exhibits a conversion of 24%. The catalyzed reactions show a substantial increase in the amount of olefin which reacts with the sodium bisulfite.

TABLE 1.—CATALYSIS OF THE ADDITION OF $NaHSO_3$ TO DODECENE-1

| Experiment No. | Catalyst | Olefin Conversion |
|---|---|---|
| 2a | None | 24 |
| 2b | $Zn(NO_3)_2$ | 55 |
| 2c | $KNO_3$ | 64 |
| 2d | $Cd(NO_3)_2$ | 61 |
| 2e | $Bi(NO_3)_3$ | 54 |
| 2f | $Cr(NO_3)_3$ | 60 |
| 2g | $Al(NO_3)_3$ | 80 |
| 2h | $4NH_4NO_3$ | 56 |
| 2i | $Ce(NH_4)_2(NO_3)_6$ | 56 |
| 2j | $LiNO_3$ | 56 |
| 2k | $Fe(NO_3)_3$ | 56 |
| 2l | $Be(NO_3)_2$ | 48 |
| 2m | $Hg(NO_3)_3$ | 49 |
| 2n | $Ni(NO_3)_2$ | 55 |
| 2o | $NaNO_3$ | 54 |
| 2p | $Co(NO_3)_2$ | 58 |
| 2q | $Mg(NO_3)_2$ | 52 |
| 2r | $Hg(NO_3)_2$ | 46 |
| 2s | $Pb(NO_3)_2$ | 44 |
| 2t | $AgNO_3$ | 44 |
| 2u | Dodecyl trimethyl ammonium chloride. | 40 |
| 2v | $Zn(OAc)_2$ | 53 |
| 2w | $Zn(Br)_2$ | 50 |
| 2x | $ZnF_2$ | 42 |
| 2y | $Zn(SO_4)_2$ | 45 |
| 2z | $ZnO$ | 57 |

EXAMPLE III

Valuable mixed alkyl sulfonates can be prepared in high yields by the method of this invention. The starting material used in this reaction is a $C_{11}$ to $C_{15}$ alpha-olefin cut furnished by the Chevron Research Company. Into a 500 ml. Parr reaction bottle there is placed 24.0 ml. of this olefin mixture (0.1 mole), 1.0 g. of potassium nitrate (0.01 mole), 21 g. of sodium bisulfite (0.2 mole), 50 cc. of water, 50 cc. of isopropanol, and 1.0 g. of surfactant. (The surfactant is a mixture of $C_{11}$ to $C_{15}$ alkyl sulfonates previously formed by sulfonating the olefin starting material employed in this reaction.) The reaction mixture is shaken under a partial pressure of oxygen of 2 pounds per square inch for three hours at a temperature of 110° C.

Following this, the mixture is cooled to room temperature, and separated, yielding 3.0 g. of unreacted olefin and an aqueous alcohol phase of product. The product phase is adjusted to pH 8.0 by the addition of aqueous sodium hydroxide, evaporated to dryness and vacuum dried, 25.0 g. of product, containing a mixture of $C_{11}$ to $C_{15}$ alkyl sulfonates is obtained. Based on the amount of olefin consumed by the reaction, a yield of 94.6% is obtained. 87.5% of the olefin was converted.

EXAMPLE IV

The wide variety of raw materials with which the process of the present invention is operable is illustrated by Table 2 which lists results of a series of runs, each according to the procedure of Example I but with 0.01 mole $KNO_3$.

Table 2

| Hydrocarbon reactant: | Conversion |
|---|---|
| (A) Effect of isonmeric olefins— | |
| Hexene-1 [1] | 52.8 |
| 2,3-dimethylbutene-2 [1] | 71.0 |
| 2-methylbutene-2 [1] | 88.7 |
| Equimolar mixture of four hexene isomers [1] | 69.3 |
| (B) Effect of carbon number— | |
| Hexene-1 | 94.4 |
| Octene-1 | 82.3 |
| Decene-1 | 72.5 |
| Dodecene-1 | 84.0 |
| Tetradecene-1 | 70.4 |
| Hexadecene-1 | 83.4 |
| Equimolar mixture $C_6$–$C_{16}$ alpha-olefins | 54.7 |

See footnotes at end of table.

Table 2—Continued

Hydrocarbon reactant: Conversion
(C) Effect of cyclic structure—
- Cyclohexene _____ 37.1
- Cyclododecene [2] _____ 23.7
- Norbornene [2] _____ 83.0

(D) Miscellaneous—
- 1,7-octadiene [2] _____ 100.0
- Styrene [2] _____ 100.0
- 1-decyne [2] _____ 22.9

[1] Run at 1:1 bisulfite to olefin ratio at 80° C.
[2] Run at 0.02 mole KNO₃ used (rather than ZnNO₃) catalyst per mole of hydrocarbon, and at a temperature of approximately 110° C. under a partial oxygen pressure of 1–2 p.s.i.g. and total pressure of 41–42 p.s.i.g. for a reaction time of 3 hours.

EXAMPLE V

Table 3 below shows that the effect of carbon number on the present invention is slight. This is in marked contrast to previous bisulfite-olefin reactions which have tended to heavily favor the lower carbon number olefins:

Table 3

| Carbons No. of alpha-olefin: | Percent conversion |
|---|---|
| $C_6$ (2-methyl-1-pentene) | 99.0 |
| $C_6$ | 97.0 |
| $C_8$ | 92.5 |
| $C_9$ | 95.5 |
| $C_{10}$ | 97.8 |
| $C_{12}$ | 94.6 |
| $C_{14}$ | 97.3 |
| $C_{16}$ | 95.0 |
| $C_{18}$ | 94.9 |
| $C_{20}$ | 81.8 |
| $C_{22}$ | 69.6 |

General conditions: 0.2 mole sodium bisulfite to 0.1 mole olefin; 0.02 mole potassium nitrate; 50.0 ml. isopropyl alcohol; 50.0 ml. water; about 5 mole percent $O_2$ in vapor; 3 hours at 110° C.; total pressure about 41–42 p.s.i.g.

EXAMPLE VI

The process of the present invention is readily adaptable to larger scale production runs as illustrated by the following procedure and results.

To a Pfaudler 10-gallon glass-lined steel reactor equipped with stirring mechanism, temperature controller, gas inlet and sampling tube the following materials are added with stirring: 32.0 moles NaHSO₃ (3331.2 g.); 16.0 moles (3696.0 g.) $C_{15}$–$C_{18}$ alpha-olefins having an average molecular weight of 231; 3.2 moles KNO₃ (323.5 g.); 50.0 g. of a surfactant prepared in a previous run; 7 liters water and 7 liters isopropanol. The mixture is stirred for approximately 15 minutes after the reagent addition is complete in order to dissolve solid material and then the reactor is sealed and warmed slowly, reaching the control temperature of 110° C. in about 1.25 hours.

The pressure during the reaction period varies from 42 to about 44 p.s.i.g. and an additional oxygen partial pressure of 2 p.s.i.g. is applied and maintained throughout the reaction period.

After 3 hours' reaction time, the heating is discontinued and the autoclave is allowed to cool over about 1 to 2 hours.

Work-up and analysis indicates that the olefins was completely consumed. The actual isolated yield based on the total olefin input is 80.3%.

What is claimed is:

1. A method for the production of organic sulfonates from unsaturated organic compounds and soluble bisulfite comprising in combination the steps of reacting a soluble bisulfite selected from the group consisting of sodium, potassium, zinc, aluminum, lithium, and ammonium bisulfites with an unsaturated hydrocarbon having from 2 to about 40 carbon atoms, said reaction being conducted at a temperature of from about 50 to 300° C. in the conjoint presence of from 0.5 to about 10 mole percent oxygen in the vapor phase and a soluble catalyst selected from the group consisting of the soluble nitrates of sodium, lithium, potassium, ammonium, zinc, cadmium, chromium, bismuth, aluminum, and alkaline earth metals, and a solvent containing at least about 1% water wherein there are present from 0.1 to about 10 moles of bisulfite per mole of double bond in the unsaturated hydrocarbon from about 0.1 to about 1.0 mole of catalyst per mole of unsaturated hydrocarbon and from about 0.25 to about 10 volumes of solvent per volume of unsaturated hydrocarbon and wherein the pH is maintained in the range of from about 4 to about 9.

2. The process of claim 1 wherein the pH is maintained at from 5 to 7, the temperature is from 70° to about 150° C., and the mole percent oxygen in the vapor phase maintained at from 2 to about 5.

3. The process of claim 1 wherein the starting material is an olefin.

4. The process of claim 1 wherein the starting material is an alpha olefin.

5. The process of claim 1 wherein the catalyst comprises potassium nitrate.

6. The process of claim 1 wherein the catalyst comprises ammonium nitrate.

7. The process of claim 1 wherein the catalyst comprises zinc nitrate.

References Cited

UNITED STATES PATENTS

| 2,653,970 | 9/1953 | Fessler. |
| 3,211,783 | 10/1965 | Hecht. |

FOREIGN PATENTS

| 682,207 | 3/1949 | Great Britain. |

BERNARD HELFIN, Primary Examiner

L. DECRESCENTE, Assistant Examiner

U.S. Cl. X.R.

260—505, 513, 429.9, 448, 501.21

IN THE UNITED STATES PATENT OFFICE

CERTIFICATE OF CORRECTION

Patent No. 3,479,397　　　　　　　　　　　　　　Dated November 18, 1969

C. J. Norton and N. F. Seppi

It is certified that error appears in the above-identified patent and that said Letters Patent are hereby corrected as shown below:

In the patent,

Col. 4, line 60　　　　　　"isonmeric" should read --isomeric--

Col. 4, line 57　　　　　　should include the following paragraph

TABLE 2

General conditions: 0.2 mole sodium bisulfite to 0.1 mole olefin; 0.01 mole potassium nitrate; 50.0 ml isopropyl alcohol; 50.0 ml water; about 5 mole percent $O_2$ in vapor; 3 hours at 110°C; total pressure about 41-42 psig.

Col. 6, line 6　　　　　　"olefins" should read --olefin--

SIGNED AND
SEALED
JUN 9 1970

(SEAL)
Attest:

Edward M. Fletcher, Jr.
Attesting Officer

WILLIAM E. SCHUYLER, JR.
Commissioner of Patents